United States Patent [19]

Jones et al.

[11] Patent Number: 5,018,197
[45] Date of Patent: May 21, 1991

[54] SECURE VIDEO DECODER SYSTEM

[75] Inventors: Gary A. Jones, Arlington Heights; Gopalan Krishnamurthy, Wheeling; Paul A. Snopko, Chicago, all of Ill.

[73] Assignee: Zenith Electronics Corporation, Glenview, Ill.

[21] Appl. No.: 559,468

[22] Filed: Jul. 30, 1990

[51] Int. Cl.$^5$ .............................................. H04N 7/167
[52] U.S. Cl. .......................................... 380/20; 380/21
[58] Field of Search ....................... 380/16, 10, 20, 21, 380/49, 52

[56] References Cited

U.S. PATENT DOCUMENTS 4,613,901  9/1986  Gilhousen et al. ................... 380/20
4,751,732  6/1988  Kamitake ............................. 380/20

Primary Examiner—Linda J. Wallace

[57] ABSTRACT

A video decoder includes an application specific integrated circuit (ASIC) that has the decoder address and a secure decryption key stored in a one-time-programmable memory. Encrypted messages are received and selectively supplied to a packet decrypter and to a video decrypter based upon the location of bits in the message string. The packet decrypter is responsive to a flag in the packet data for utilizing a secure key or a unsecure key for decryption of the packet data. The information derived from the secure decryption and the secure key itself are never available (or ascertainable) outside of the ASIC. Only information concerning the unsecure key is available outside of the integrated circuit.

3 Claims, 2 Drawing Sheets

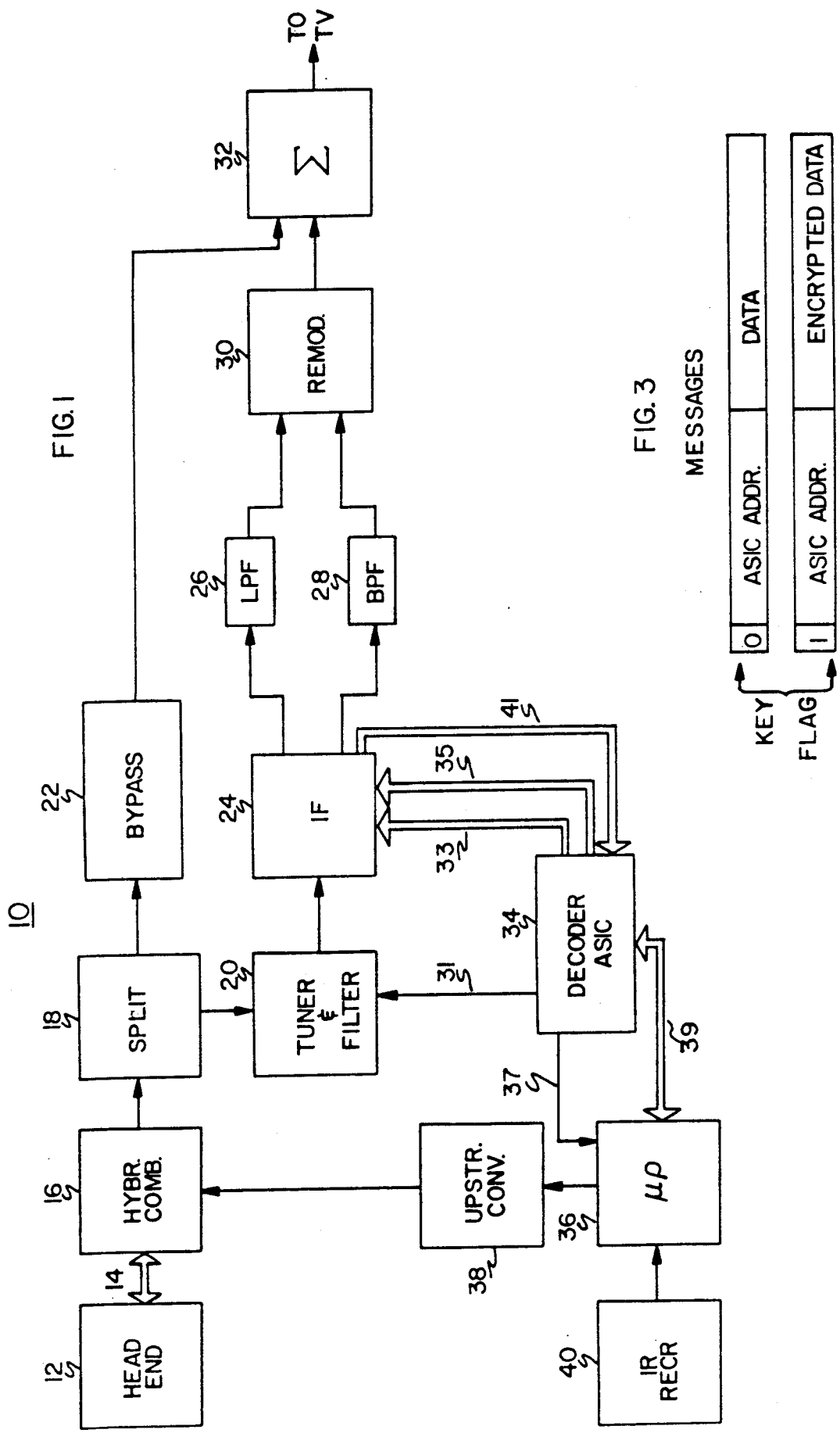

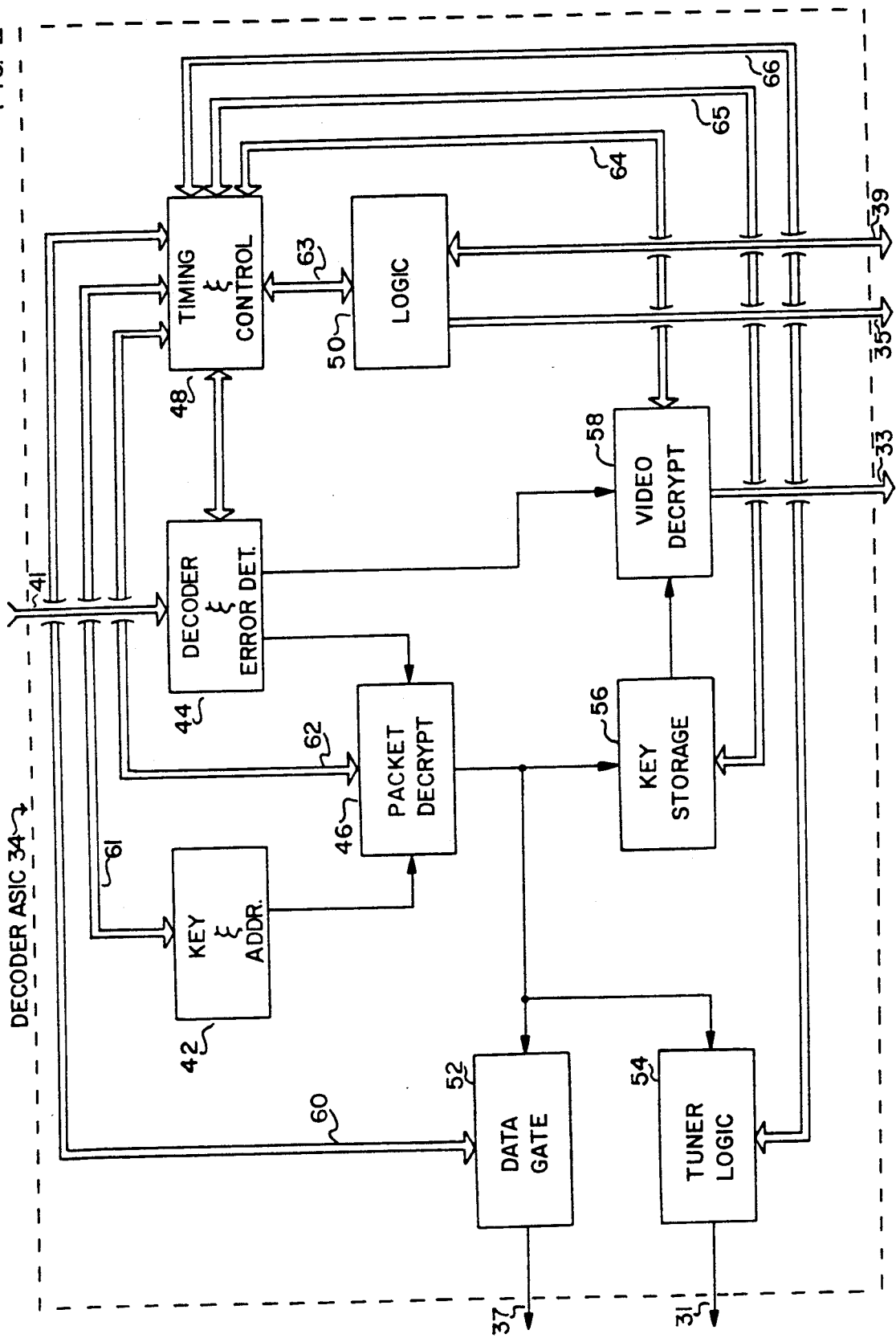

SECURE VIDEO DECODER SYSTEM

CROSS-REFERENCE TO RELATED APPLICATIONS

This application is related to application Ser. No. 507,345, filed Apr. 10, 1990, entitled "Modulator-Remodulator with Common Local Oscillator," and assigned to Zenith Electronics Corporation.

BACKGROUND OF THE INVENTION AND PRIOR ART

The problem of security in cable television systems has been paramount for many years. Cable operators, as is well known, depend to a large extent upon the income from premium programming to sustain their operations. Premium programming, such as movie channels and special event channels, are provided to a subscriber who pays an additional fee therefor. These channel programs are scrambled to prevent unauthorized subscribers from receiving them and may be accompanied by an authorization key which authorized subscribers have to enable descrambling of the television signal.

In U.S. Pat. No. 4,876,718 issued Oct. 24, 1989, entitled "Secure Data Packet Transmission System and Method," a technique for simultaneously encrypting and error protecting data in a bit packet communication system is disclosed and claimed. In U.S. patent application Ser. No. 238,956, filed Aug 31, 1988, entitled "TV Signal Transmission System and Method," a technique for transmitting a low power hybrid video signal that is also encrypted is disclosed. The techniques disclosed in this patent and patent application are both advantageously utilized in the preferred embodiment of the present invention, although the invention is not restricted thereto.

In accordance with the present invention, an application specific integrated circuit (ASIC) includes a one-time-programmable (OTP) memory for storing a subscriber unit address and decryption key for decrypting messages supplied over a cable from a cable head end. Preferably the messages are simultaneously encrypted and error protected in accordance with the teachings of the above-mentioned patent and provide so-called packet data and video data in encrypted form to each subscriber unit or decoder. The encryption of the packet data is accomplished with two different keys, one of which is very secure and confined entirely to the ASIC and the other of which is relatively unsecure and therefore permitted outside of the ASIC (via external communication paths). Thus the present invention involves a decoder system in which a secure decryption key is not available to, or readily ascertainable by, would-be pirates, whereas certain unsecure data (and its decryption key) is more easily ascertainable. The result is a relatively low cost, high security decoder system.

OBJECTS OF THE INVENTION

A principal object of the invention is to provide a novel video decoder system.

Another object of the invention is to provide an improved low cost, high security video decoder system.

BRIEF DESCRIPTION OF THE DRAWINGS

These and other objects and advantages of the invention will be apparent upon reading the following description in conjunction with the drawings, in which:

FIG. 1 is a block diagram of a decoder system constructed in accordance with the invention;

FIG. 2 is a detailed block diagram of the decoder ASIC of FIG. 1; and

FIG. 3 shows the encryption key flags in typical messages.

DESCRIPTION OF THE PREFERRED EMBODIMENT

Referring to FIG. 1, reference numeral 10 generally denotes a video decoder system. A cable head end 12 supplies encrypted message and video signals over a bidirectional communication link 14 to a plurality of subscriber units, only one of which is illustrated. A hybrid combiner circuit 16 in the input of the subscriber unit couples received signals to a television signal splitter 18 (and is also capable of sending signals from the decoder to the head end 12). Signal splitter 18 supplies signals to a tuner and filter 20 and to a bypass circuit 22. The output of tuner and filter 20 is supplied to an IF circuit 24 which in turn supplies a low pass filter 26 and a bandpass filter 28 with video and audio signals, respectively. The signals from these filters are combined in a remodulator circuit 30, the output of which is supplied to a summation circuit 32. Summation circuit 32 also receives the output of bypass circuit 22 and produces an output signal that is supplied to a television receiver (not shown) that is coupled to the subscriber decoder unit. A decoder ASIC 34 receives signals via a plurality of leads 41 from IF 24 and supplies signals to tuner and filter 20 over a lead 31. ASIC 34 also supplies signals to IF 24 over pluralities of leads 33 and 35 and is in communication, via a bidirectional communication bus 39, with a microprocessor 36. A data link 37 for supplying unsecure data couples ASIC 34 to microprocessor 36. Microprocessor 36 also supplies an upstream converter 38 which feeds hybrid combiner circuit 16 for sending information back to the cable head end 12 from the subscriber decoder unit. Microprocessor 36 is also controllable from signals received from an IR receiver 40.

As reference to the cross referenced copending application Ser. No. 507,345 will show, splitter 18 provides all of the non premium channels, i.e. the nonencrypted channels, to bypass circuit 22 which permits such signals to be received directly by a television receiver coupled to the subscriber decoder unit. Premium channels are provided at higher frequencies and supplied to tuner 20 and IF 24 as fully disclosed in the cross referenced copending application. These premium channels include high frequency video and encrypted messages, consisting of data, decoding keys and low frequency restoration data. All of the signals may be encrypted and error protected in accordance with the teachings of the above-mentioned patent.

In FIG. 2, decoder ASIC 34 is indicated by the dashed line block. ASIC 34 includes a decoder and error detector 44 which may decode and test for errors in the encrypted and error protected signals from the cable head end. Decoder 44 supplies a packet decrypter circuit 46 and a video decrypter circuit 58. Data that detector 44 shows as having errors is discarded and needs to be sent again. This is generally handled by multiple redundant transmissions from the cable head end. A key and address storage device 42 is also coupled to packet decrypter 46. The output of packet decrypter 46 is supplied to a data gate circuit 52, a tuner logic circuit 54 and to a key storage circuit 56. The data gate circuit supplies unsecure data over data link 37 to microprocessor 36 and tuner logic circuit 54 supplies tuning control information via lead 31 to tuner and filter 20. (See FIG. 1.) Key storage circuit 56 is coupled to video decrypter 58 and in conjunction with the data supplied to video decrypter 58 enables unscrambling of the video signal. A timing and control circuit 48 and a logic circuit 50 complete the decoder ASIC 34. As indicated by the bidirectional control lines 60–66, timing and control circuit 48 is in communication with each of the functional blocks and supplies appropriate signals for enabling them to perform their various functions. Video decrypter circuit 58 supplies descrambling information to IF circuit 24 over leads 33 and logic circuit 50 supplies information to IF circuit 24 over leads 35 for reconstituting the video signal.

As shown in FIG. 3, typical message configurations may include portions of video data and packet data and a flag bit. The flag bit determines whether the data is secure or unsecure and instructs use of the proper decryption key. The key and address information in block 42 are both secure. The address uniquely identifies the particular subscriber unit in the system. The decryption key stored in storage device 42 may be common to a group of subscriber units. Obviously, the greatest security is obtained by having a unique decryption key and a unique address for each subscriber unit, but that is not economical. By having a highly secure decryption key for a group of subscriber units and requiring that decryption key, in addition to a unique address for the subscriber unit, a level of security commensurate with reasonable cost and the objective of foiling would-be pirates is readily achieved. Preferably, all data (except global data intended for all units) is encrypted.

The format of the data decoded by decoder and error detector 44 is such that the encrypted packet data is supplied to packet decrypter 46 and the encrypted video data is supplied to video decrypter 58. The packet data includes a flag which indicates whether it is secure data or unsecure data (i.e. which key is needed to decrypt it). The secure data generally comprises the keys to be used to decrypt the video data supplied to video decrypter 58. Those keys are downloaded periodically by the cable head end in addressed packets to the individual subscriber units. The keys may also be stored in key storage circuit 56. No access to the keys via the microprocessor is permitted, although the keys may be relocated in storage by the microprocessor, or the microprocessor could direct that a key at a particular location be used to decrypt. The unsecure packet data, such as on screen display information, channel tuning information or public service announcements and the like, is supplied to data gate 52 and tuner logic 54. Data gate 52 is under control of timing control circuit 48 and prevents any data that is associated with a secure decryption key from appearing on link 37, i.e. outside of ASIC 34. Consequently, the only information accessible to a would-be pirate is that which appears on data link 37 and on leads 31, 33, 35 and 41 and bidirectional communication bus 39. None of this information includes any secure keys nor any information that may be correlated with a secure key. The secure keys and all data corresponding thereto are confined within the ASIC 34. Consequently, a would-be pirate would face abnormal difficulties in trying to clone a decoder unit.

The system of the invention maintains the secure data and key information within the proprietary ASIC 34 and such data and key information is not available outside of the chip. Since the keys are preferably not hardwired, merely viewing the integrated circuit will not provide useful information. Indeed, the keys cannot be determined even by microscopic observation of the circuit. Further, in accordance with the teachings of the above-described patent, the keys may be changed randomly (and often) and pose an almost impossible task of decryption for a would-be pirate.

What has been described is a novel low cost system for a secure video decoder. It is recognized that numerous modifications and changes in the described embodiment of the invention may be made to those skilled in the art without departing from its true spirit and scope. The invention is to be limited only as defined in the claims.

What is claimed is:

1. A cable decoder system comprising;
    means for receiving message encrypted with a secure decryption key and another decryption key and a scrambled video signal from a cable head end;
    means for supplying said encrypted messages to an integrated circuit;
    means in said integrated circuit for storing said secure decryption key and said another decryption key;
    means in said integrated circuit for decrypting said messages with said secure decryption key for enabling descrambling of said scrambled video signal;
    means in said integrated circuit for decrypting portions of said received messages that are encrypted with said another decryption key; and
    means for permitting signals exiting said integrated circuit to only reflect said another decryption key.

2. The decoder of claim 1 wherein said messages include packet information and video information and wherein said packet information is encrypted partially with a secure decryption key and encrypted partially with an unsecure decryption key.

3. A cable decoder system comprising;
    means for receiving messages including secure data encrypted with a secure decryption key and unsecure data encrypted with an unsecure decryption key and a scrambled video signal from a cable head end;
    means for supplying said encrypted messages to an integrated circuit;
    means in said integrated circuit for storing said secure decryption key and said unsecure decryption key;
    means in said integrated circuit for decrypting said secure data with said secure decryption key for enabling descrambling of said scrambled video signal;
    means in said integrated circuit for decrypting said unsecure data with said unsecure decryption key; and
    means for permitting signals exiting said integrated circuit to only reflect said unsecure decryption key.

* * * * *